Figure 1:
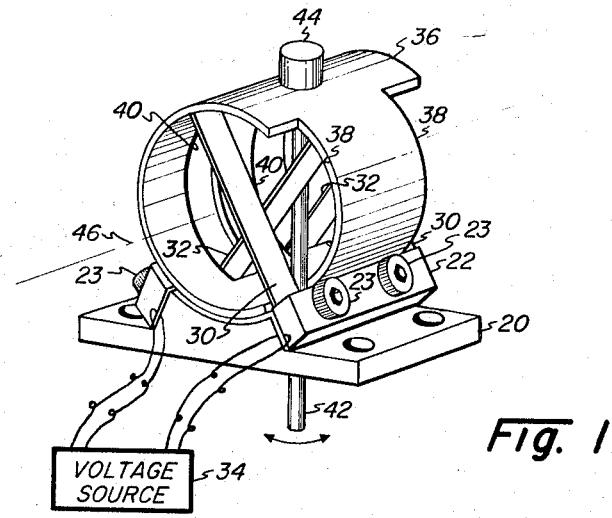

Dec. 13, 1966  S. K. HSU  3,292,020

TRANSDUCER

Filed Nov. 1, 1963

INVENTOR.
STEVEN K. HSU

BY

*Richard J. Seeger*
ATTORNEY

3,292,020
TRANSDUCER

Stephen K. Hsu, Ann Arbor, Mich., assignor to The Bendix Corporation, Southfield, Mich., a corporation of Delaware
Filed Nov. 1, 1963, Ser. No. 320,669
3 Claims. (Cl. 310—8.6)

This application pertains to a transducer for conversion between electrical energy and mechanical motion and more particularly for obtaining small mechanical movement from and very accurately proportional to an electrical input signal.

It is an essential object of this invention to provide a transducer for receiving an electrical signal and by means of a piezoelectric member change this signal in very accurate proportion to a small mechanical movement which is particularly useful as the control element in the pilot stage of a servo valve.

A further object of this invention is to provide such a transducer which is relatively insensitive to external accelerative forces so that the control element is little influenced by any acceleration it might experience.

It is an object of this invention to provide in such a transducer apparatus which obtains its mechanical movement by rotation about an axis of rotation fixed relative to the mounting base, so that various output displacements can be obtained by proper choice of length of radius from the axis; and which has its center of mass substantially on this axis of rotation so that accelerative forces will have little affect on the mechanical movement.

It is another object of this invention to provide a transducer of the kind mentioned in which individual piezoelectric members may be added to or subtracted from the total members to obtain a transducer having the desired output force characteristics.

It is an object of this invention to provide such a transducer by placing in a cylindrical housing a number of piezoelectric members which are fixed to the inner circumference of the housing and extend diametrically across the housing and through a slot in the housing to a base, with the piezoelectric members arranged so that when they are energized by an electrical voltage potential, all will bend to rotate the cylindrical housing relative to the base in a common angular motion. In this construction, the piezoelectric members can be as long as the largest dimension of the housing thereby providing a greater bending arc. Further, the piezoelectric members may be fixed to the housing and the base to securely support the housing at all times. The piezoelectric members are spaced equally about the housing, generally 90° apart so that any inertia force produced by any linear acceleration will be taken by the tension and/or compression of the members and will not generate any motion of the housing relative to the base. Further, an output control element, for instance, the control flapper of a servo valve, is fixed to the cylindrical housing to provide the output force and/or displacement. The housing is weighted or balanced so that the center of mass of the control member is on the axis of rotation of the housing.

Figure 2:
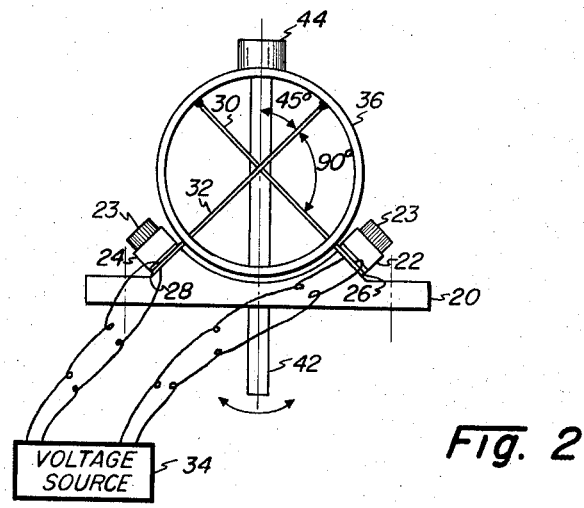

These and other objects and advantages will become more apparent when a preferred embodiment is considered in connection with the drawings in which:

FIGURE 1 is a view in perspective of a preferred embodiment of this invention; and FIGURE 2 is an end view of the embodiment in FIGURE 1.

Shown in the drawings is a preferred embodiment of this invention having a base 20 with clamps 22, 24 bolted to raised electrically insulated portions 26, 28 respectively thereof. Base 20 may be fixed to the body of a servo valve (not shown).

Held by clamp 22 are a pair of piezoelectric bender strips 30 and held by clamp 24 are a pair of piezoelectric bender strips 32. Strips 30 and 32 are inclined at an angle of 45 degrees to the base 20 and form an angle of 90 degrees to each other. Strips 30 and 32 are made of two thin layers of piezoelectric ceramics, such as lead zirconate titanate which are electrically poled in opposite directions and which have an electrically conductive vane sandwiched in-between. A thin layer of silver may be on the outer sides of each of the ceramic layers. When a voltage is placed across the outer surfaces of the strips by source 34, one layer of the ceramic contracts while the other layer expands resulting in bending of the strip. Such strips are commercially available and the Clevite Corporation manufactures a suitable strip under the trade name of "Bimorph Bender." With the connections from voltage source 34 as shown, base 20 and clamps 22, 24 should be conductive and bolts 23 should be insulated from base 20. Of course, individual connections from source 34 to each strip 30, 32 may be made.

Bonded to the free ends of the strips 30 and 32 is a cylindrical housing 36 which has slots 38 formed therein for the passage of strips 30 and slots 40 formed therein for the passage of strips 32. Also bonded to the housing 36 is a control member 42 which may control the fluid flow through the pilot stage of a servo valve (not shown). A balancing weight 44 is bonded to the surface of housing 36 so that the center of mass of housing 36, strips 30 and 32 and control member 42 is on the axis of rotation 46 of housing 36.

The piezoelectric strips 30 and 32 are so placed in the housing 36 that when an electrical signal is applied thereto, the ends of the strips 30 and 32 which are bonded to the housing 36 will all move in cooperation to turn housing 36 clockwise for one direction of voltage potential and counterclockwise for the other direction of voltage potential from voltage source 34, about the axis of rotation 46.

Since the arms 30 and 32 are placed at a 90 degree angle relative to one another, the housing is restrained from any linear motion relative to the base by the induced tension and/or compression of the arms. The location of the rotating axis 46, relative to base 20, is therefore very insensitive to any inertia force due to linear acceleration of the mounting base. Also, due to weight 44, the center of mass of all the rotating members, 36, 42, 44 and part of the strips 30 and 32 is on the axis of rotation 46 so that when any accelerative force is applied to the base 20, the resultant inertia torque about axis 46 is negligibly small and hence very little movement will be made by control member 42 relative to base 20, thereby maintaining accurate positional control of member 42 even if placed in fast moving spacecraft, aircraft, or the like.

Piezoelectric bender strips bend due to an electrostatic charge. A few hundred volts is generally necessary but the only current needed is that which is required to charge the material in the manner of an electrical condenser. It has been found that with four bimorph strips one-quarter inch wide and .021 inch thick, for a cylinder of one-inch diameter, the displacement output of control member 42 at a point 1.3 inches from the center of the cylinder is plus or minus .060 inch at a voltage of plus or minus 330 volts D.C. or approximately .15 milliradian per volt. Mid-position force of control arm 42 is about 1.5 ounces at 400 volts and larger force output is obtainable with corresponding reduced displacement, by using thicker and shorter bending strips. Also, additional bending strips can readily be added by increasing the length of clamps 22 and 24 and the length of cylinder 36 to further increase the force applied by the transducer.

Due to the symmetry of the transducer and components, thermal expansion will have little effect on the null position of the transducer and only a small effect on the displacement gain. The temperature range of this transducer is only limited by thermal properties of the piezoelectric benders.

While the preferred embodiment is shown as a motor wherein an electrical signal is transformed to mechanical movements, this invention can as well be used as an electric generator or displacement detector by subjecting control element 42 to an oscillating motion or a displacing force, and the electrical potential generated at the leads coming from strips 30 and 32 will be proportional to the input motion of the control element 42.

The piezoelectric members used in the preferred embodiment are comprised of two ceramic layers of lead zirconate titanate each about .020 inch in thickness and separated by a brass layer of .002 inch thickness with a .002 inch silver plate being on the outside surface of each of the ceramic layers.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:
1. Apparatus comprising
    a cylindrical housing,
    a base being located exteriorly of said cylindrical housing
    a plurality of piezoelectric members each having one of their ends fixed to said base and the other of their ends extending through said cylindrical housing and fixed to the inner circumference of said cylindrical housing,
    said plurality of piezoelectric members being deflectable by an electrical signal to rotatively move said housing relative said base.
2. The apparatus of claim 1 with
    an output member having one end connected to the inside circumference of said cylindrical housing and extending across said housing and movable with said housing,
    the other end of said output member having a radius of rotation substantially larger than the radius of rotation of said housing, thereby defining an arc having a radius substantially larger than the arc radius of said housing.
3. The apparatus of claim 2 with
    a counterbalancing weight being attached to the circumference of said cylindrical housing thereby placing the mass center of the housing, the effective mass of the piezoelectric members, and the mass center of the output member substantially on the center axis of the rotation to make the output member substantially insensitive to accelerative forces.

References Cited by the Examiner
UNITED STATES PATENTS 3,166,683 1/1965 Gootherts _____ 310—8.6
3,168,660 2/1965 Marks _____ 310—8.7

MILTON O. HIRSHFIELD, *Primary Examiner.*

A. J. ROSSI, *Assistant Examiner.*